March 11, 1930.  R. ERBAN  1,750,167
FRICTIONAL GEARING
Filed Dec. 30, 1927   2 Sheets-Sheet 1

R. Erban
INVENTOR

By: Marks & Clark
Attys.

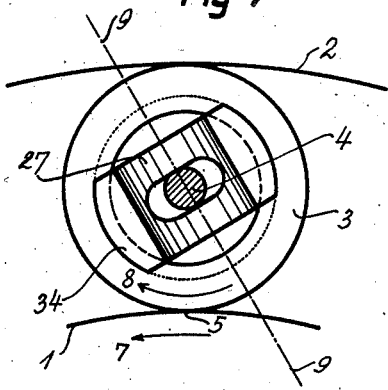
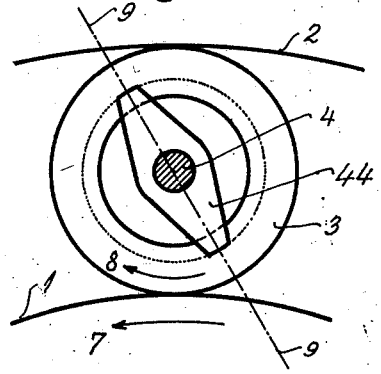
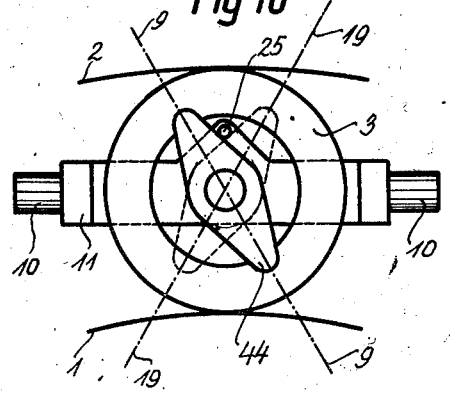
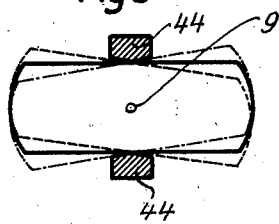
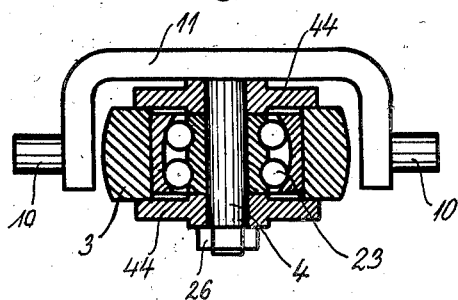
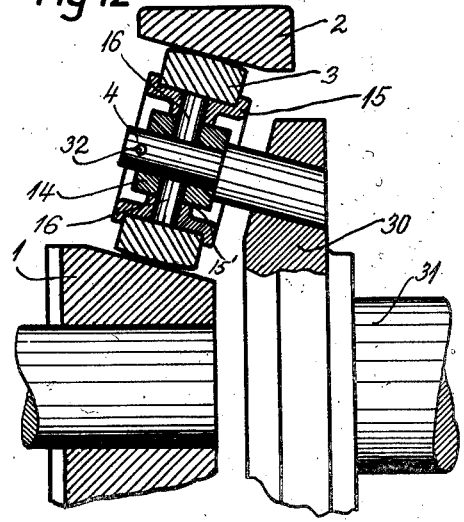

Patented Mar. 11, 1930

1,750,167

UNITED STATES PATENT OFFICE

RICHARD ERBAN, OF VIENNA, AUSTRIA

FRICTIONAL GEARING

Application filed December 30, 1927, Serial No. 243,746, and in Austria January 20, 1927.

My invention relates to frictional change speed gearings of the kind in which planet rollers are inserted between races and may be rocked or tilted around their axis in order to come into contact with different circles on said races, so that different speeds may be derived from said frictional gearing corresponding to the different positions of the rollers.

In gearings of this kind in order to obtain satisfactory permanent working it is essential to exclude gliding friction between the rollers and the races as the pressure between these parts is heavy and the rotational speed is relatively large so that any gliding friction is immediately damaging the rollers or races by grinding small flat surfaces which impair or partly arrest the correct rolling movement and thus lead to rapid destruction of the parts.

Now considerable difficulties have been experienced in connection with the tilting or rocking of the rollers, as it is necessary to exclude gliding friction also during such tilting or rocking movement and as it is equally necessary to reduce the resistance of the roller against the rocking or tilting impulse which is very heavy.

This resistance is mainly due to the fact that there is a marked tendency of the roller to remain within the plane which it occupies and upon the circle along which it rolls and each endeavor to make the roller leave said plane or circle is opposed with considerable force. Therefore the roller during such change-speed tilting or rocking movement having the purpose to bring it into the correct position for another speed, when speed variation is necessary, is subject to the various internal forces above mentioned and moreover during such adjustment is also subject to an external force tending to effect the adjustment which is not in any way related to the former. Thus there exists a certain conflict between the forces generated and acting within the gear and the external forces acting during adjustment and this will cause a number of disturbing influences to arise which impair the correct operation and especially a correct adjustment.

To obviate the various defects experienced in connection with the adjustment I have proposed in my copending application Ser. No. 35,988 of June 9, 1925, to dispense with fixed journalling means for the rollers and to journal the rollers in such a way that they have three degrees of freedom with respect to their axis of rotation. Therefore the external adjusting force (exercised by hand or a governing mechanism) is not acting directly upon the roller but only indirectly so that the rollers may assume gradatim the desired position under the influence of the internal forces themselves.

This self-adjustment of the rollers is however taking place in a satisfactory manner only when the stabilizing forces acting upon the roller are relatively great so that the external force when acting only indirectly is relatively insignificant at each given moment and the above explained principle is therefore based on the idea to substitute for a heavy pressure tending to move the rollers during a very short interval of time into the desired position, only a slight force acting during a protracted period of time. However the above mentioned conditions only exist when the gear is running at relatively considerable speed and moreover this method is also liable by protracting the period of influence to give rise to overrunning of the correct position desired and thereby to a swinging of the roller around said correct position.

It is the object of this invention to maintain the various advantages that can be derived from the application of the principle above mentioned while at the same time avoiding the disadvantages due to mere indirect action of the adjusting force.

According to this invention therefore the rollers are journalled with only two degrees of freedom, thus retaining sufficient freedom for allowing self adjustment, but are connected directly to the adjusting mechanism. This combination is possible by virtue of the fact that the forces generated during adjustment are always acting in such a manner that the roller tends to preserve its plane of rotation and therefore the forces due to adjustment are always causing a rocking or tilting of the roller around an axis that is siuated in the plane of the circles of contact of the rollers with the races. If this tendency of the rollers is considered it is clear that two degrees of freedom are sufficient to allow self-adjustment of the roller and therefore the third degree of freedom may be dispensed with according to this invention. The roller may thus be journalled in such a way that a real or an ideal axis of rotation for the tilting or rocking movement can be permanently maintained, which is situated in a plane passing through the circles of contact of the roller with the races, the roller being otherwise capable of free movement around such axis. This axis may also be utilized as the point of application of the forces tending to effect the adjustment of the roller.

The invention therefore consists in journalling the roller upon an axis passing through the rolling paths of the rollers upon their races, in allowing free movement around such axis and in connecting such axis with the adjusting mechanism for the rollers actuated by hand or by any appropriate governing means. This axis according to a further feature of this invention is preferably inclined with respect to the diameter passing through the points of contact of the roller with the races and the inclination is such that there exists a lead or angle of relative advance with respect to such diameter in the direction of rotation of the roller. This inclination serves the purpose to remove said axis of rotation from the two positions where there exists an unstability and which are the diameters passing through the points of contact itself and the diameter at right angle thereto which is the rocking axis for the adjustment itself.

Further features of the invention will appear from the following specification.

The invention is illustrated in the accompanying drawings, which show diagrammatically the principle of this invention and several modifications of the parts of the frictional gear constructed according to my invention.

Fig. 1 shows a simplified diagram in order to illustrate the principle of the invention.

Fig. 2 also shows a diagram of a roller constructed according to this invention.

Figs. 3 and 4 show one modification of this invention when applied to one of the rollers inserted between the usual races, Fig. 3 showing a vertical section through one of the rollers provided with a short axle or pivot arranged and held within the roller and serving as the rocking or tilting axis, while Fig. 4 shows a horizontal section through the same modification, the carrier frame being shown in top view.

Figs. 5 and 6 show another modification of this invention, Fig. 5 showing a sectional elevation of this modification, while Fig. 6 shows a section through the same, taken along the line 28—28 of Fig. 5.

Fig. 7 shows a modification similar to that shown in Figs. 5 and 6 with a simplified arrangement of the lateral supports.

Fig. 8 diagrammatically shows a further modification of this invention, in which an ideal rocking axis is created by means of lateral stops limiting the movement in one direction.

Fig. 9 shows a cross section through the stops and their position with respect to the roller which comes into contact with said stops only along a line.

Figs. 10 and 11 show a further modification of the invention, Fig. 10 being an elevation and Fig. 11 a horizontal section, said modification being operative also if the direction of rotation of the rollers is inversed and showing means for an automatic adjustment of the stops for different senses of rotation.

Fig. 12 shows part of a section through the whole frictional gearing, which in this example is provided with conical races, and illustrates also at the same time another modification of the roller carrying device, the races being shown in longitudinal middle section, while the roller for the sake of illustration is sectioned along the inclined axis in order to show the trunnions serving as a rocking or tilting axis for the roller.

Figure 1:
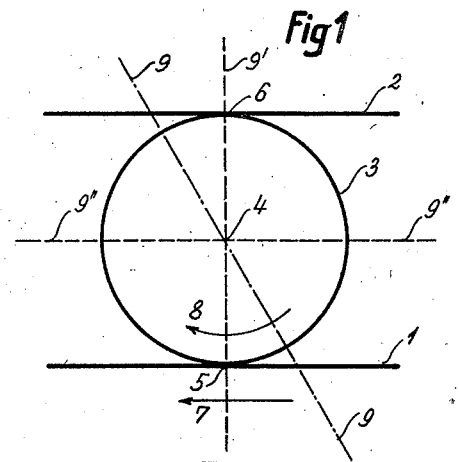

In order to understand the principle of this invention reference is first made to Fig. 1 of the drawing, in which a roller 3 is represented by a circle and in which the two races 1 and 2 are only represented by straight lines. The race 1 is assumed to be driven in the direction of the arrow 7 and the roller is thereby rotated in the direction of the arrow 8. Assuming now for the sake of explaration that the center 4 of the roller 3 is fixed, then the race 2 will be driven from the roller with the same velocity which has been imparted to the race 1, but in the opposite direction to the race 1. If however the race 2 is assumed to be fixed the roller 3 will move along the line 9'', 9'' in such a way that the point 4 will move along said line with half the velocity of the driven race 1.

In this diagram the races are represented by straight lines so that the entire races would be half cylinders with a common axis 9'', 9''. Any rocking or tilting of the roller to change the speed of rotation can therefore only be effected around the axis 9'', 9''. It will be clear that when the roller is rocked forcibly this must be accompanied by gliding of the roller in a transverse direction with respect to the races, if no special means are provided to bring the rollers without gliding from one position into another. This gliding of the rollers together with all the other forces which are acting on the same result in a heavy resistance against any rocking or tilting movement and consequently it is possible that the parts of a gear may suffer during such rocking movement of the rollers.

According to this invention therefore a method is proposed by means of which on the one hand a direct connection between the tilting or rocking mechanism and the roller is possible, while on the other hand free movement of the roller under the influence of the force acting upon it is allowed to a sufficient extent to move a roller for instance from the middle position shown in Fig. 1 to another position by rocking it around the axis 9'', 9''. It is necessary that such roller performs a movement upon said races along a path which is inclined to the generatrices of the races and the roller must therefore be capable to adjust itself in such a manner that this inclined path may be taken without gliding. The correct position of the roller in order to be able to effect such movement is therefore one which necessitates a certain amount of angular displacement around the axis 9'', 9''.

These requirements are answered when the roller which should be rocked or tilted around th axis 9'', 9'' is arranged in such a manner that it may freely swing around an axis 9, 9 situated in the same plane as the axis 9'', 9'' and 9', 9', and if these axes 9, 9 are inclined to the direction of the axes 9'', 9'' and 9', 9'. It is preferable in this case that the axis 9, 9 leads or has a certain angle of advance in the direction of rotation with respect to the diameter 5, 6 which connects the two points of contact 5 and 6 of the roller with the races.

The tilting or adjusting mechanism may now act directly upon the roller by means of a connection with the axis 9, 9 while the roller may freely move around said axis and thus will be able to adjust itself in such a manner that the path which it describes will always correspond to the resultant force or movement of all the forces and movements acting upon it, so that adjustment from one position to another may always be effected without necessity of applying heavy forces and without gliding.

Figure 2:
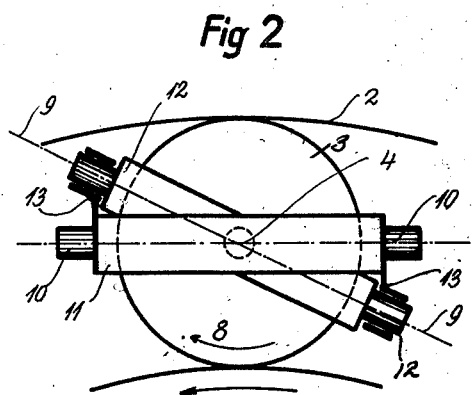

In Fig. 2 a complete diagram is shown in which the way in which the roller is journalled is illustrated. The roller 3 which rolls upon the two races 1, 2, shown in this case already as toric surfaces, is journalled within a frame 11 that may pivot around the trunnions 10. The frame 11 is connected with the rocking or adjusting mechanism proper in any suitable way not shown in the drawing. It carries supports 13 for the bearings of a shaft or axle 12 which is the shaft or axle around which the roller may swing. The position of the shaft 12 with respect to the diameter through the points of contact is governed by the direction of rotation which in Fig. 2 is indicated by means of the arrows 7 and 8.

To be able to carry the principle shown in Figs. 1 and 2 into effect various constructions may be used and only some constructional modifications are described in the following specification.

Figure 3:
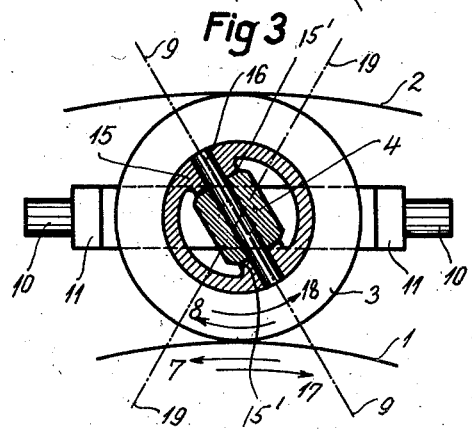
Figure 4:
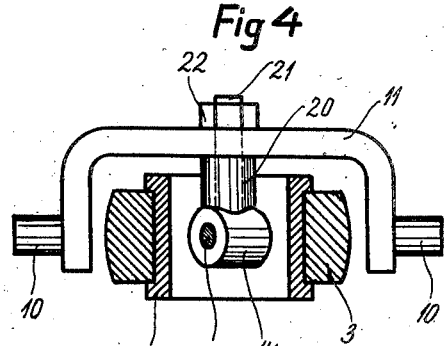

In the modification shown in Figs. 3 and 4 there is a real axis of rotation formed by a structural element such as the pivot 16, around which the roller may rock. The roller is carried by a frame 11 provided with trunnions 10, which may be connected with the shifting or adjusting mechanism proper by some well known means, for instance by a bell crank lever or the like, which is not shown in the drawing and which is fulcrumed by means of a pivot or the like within the cage of the gearing. The mechanism for rocking the roller does not form any part of this invention and is illustrated more fully for instance in my copending application Ser. No. 668,342.

The roller 3 is seated upon the bearing ring 15, which is provided with bores into which the pivot 16 may enter. Said pivot 16 is held by means of a pivot bearing 14 which is carried by means of the short stud 20 fixed to the frame 11 by means of the screw bolt 21 and the screw 22. The bearing ring 15 is provided with two thrust bearing faces 15' which are arranged perpendicularly to the bores and which are seated upon corresponding thrust bearing faces of the pivot bearing 14.

As will be seen from the drawing, the roller may be rocked not only around the axis of the trunnions 10 but also around the pivot 16 which is held by the pivot bearing 14. The bearing ring 15 together with the roller may be rocked upon the thrust bearing faces 15' of the pivot bearing 14 around the axis 9, 9. The position of the rocking axis shown in the drawing is only correct for the direction of rotation which is indicated by the arrow 8 and which corresponds to the direction of rotation of the race 1 indicated by the arrow 7. The opposite direction of rotation is indicated in the drawing by means of the arrows 17, 18 and if such a direction of rotation is used the trunnion 16 must be rocked so as to assume the position indicated by the line 19, 19.

Figure 5:
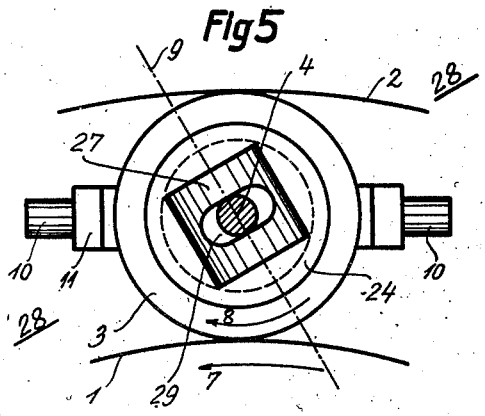
Figure 6:
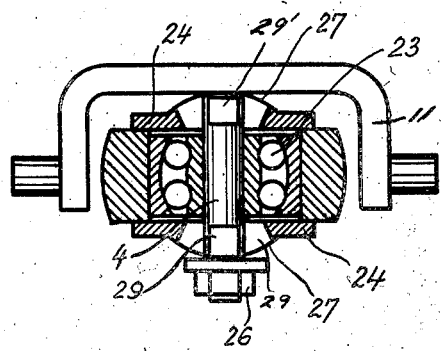

In Figs. 5 and 6 a second modification of the arrangement is shown in which rocking or tilting of the roller 3 is effected not about a structural element, such as an axle or pivot, but only about a virtual axis 9, 9. This is obtained by arranging the roller in such a way as to be capable of all round movement in every direction and by providing further means limiting such all round movement so that only in the desired directions the roller has actual freedom of movement.

In the modification shown the frame 11 which may be rocked around the trunnions 10 carries a bolt 4 upon which the roller 3 is journalled by means of a ball bearing 23 which is however of the kind provided with a spherical race. Such a ball bearing will allow three degrees of freedom of rotational movement. One of the degrees of freedom of the rotational movement is however suppressed by means of the shields 24 which are fixed on both sides of the rollers on the bolt 4 and are bearing against the roller. These shields are provided with central slots 29 which may either be arranged in curved protruding or cylindrical parts 27 of the shields or in a cover plate or other piece held by said shields. These slots are arranged in the desired direction which is perpendicular to the axis 9, 9. These protruding curved parts or cover plates are bearing against the frame 11 and against a screw 26 fixed on the bolt 4 respectively. In order to avoid any rotational movement of the shields 24 flattened parts 29' are provided on the fixed bolts 4 which co-operate with the flat parts of the slots 29.

As will be seen from the above by virtue of the slots 29 and by means of the bolts 4 passing through said slots, the roller can only perform a movement around the virtual axis 9, 9, so that said roller has only two degrees of freedom with respect to rotational movement in spite of the special journaling of the rollers on the bolt 4 which would admit an all round movement.

The size of the shields may be materially reduced as shown in Fig. 7, so that there are only guiding extensions 34 bearing upon the body of the rollers on both sides of the slots only. In other respects however the modification shown in Fig. 7 is the same as that shown in Figs. 5 and 6.

To obtain a rocking or tilting movement around a virtual axis 9, 9 also other means may be devised, such as those shown in Figs. 8 to 11. Also in this case the roller is journalled in such a way that it would be able to perform a rotational movement in every direction by means of a spherical ball bearing. To allow however only two degrees of freedom the roller is held along a line 9, 9 by means of a knife edge or projecting rib or by means of any other projecting surface which makes contact with the roller only along a line. When the roller is held along such a virtual axis by means of knife edges or ribs, it is preferable to allow a certain play between it and the lateral face of the roller to exclude friction of the roller when rotating around its axis in its normal position, as a small play will not in any way affect the operation.

The principle used in this modification is illustrated diagrammatically in Figs. 8 and 9. On both sides of the rollers small shields or sheets 44 are fixed to the bolt 4 and these shields are provided at the side facing of the roller with knife edges, ribs or simply with curved parts, as will be seen from Fig. 9, which shows a section through said shields. These knife edges, ribs or curved surfaces will be in contact with the roller 3 only along a straight line and will thereby determine an axis about which the roller may be rocked. The knife edges or other surfaces in contact with the roller must be so shaped that they are receding at both sides of the line of contact 9, 9 so that the roller may have sufficient freedom of movement as has been indicated in Fig. 9 by the two positions of the roller shown in dotted lines. As already mentioned between the surfaces and the rollers a moderate play must exist to avoid continuous friction between the parts when the roller is performing its planet movement.

In Figs. 10, 11 and 12 is illustrated a further modification of the arrangement which allows operation of the gearing in both directions of rotation without special adjustment. This modification is constructed according to the principle explained with reference to Figs. 8 and 9 of the drawings, but the shields 44 which carry the knife edges are in this case loosely mounted upon the bolt 4 which is fixedly mounted on the frame 11. Said bolt will also carry the ball bearing 23 of the roller 3 provided with an outer spherical race (Fig. 11). A screw 26 holds the shields in axial direction. On the frame 11 and also on a washer inserted between the screw 26 and the shields 33 a protruding pin 25 is mounted which serves as a fixed stop for the shields 44 between which the roller is rotating with a certain play. When the direction of rotation of the roller is changed the roller will by means of occasional friction carry the loosely mounted shields 44 with it and will move these shields until they are stopped by the pins 25 and for this direction of rotation the shields are held against such pin. The outer contour of the shields 44 is so shaped that stopping against the pin 25 will always occur either in the position 9, 9 or in the position 19, 19 and in these positions the shields 44 will remain as long as one direction of rotation of the roller is maintained, so that the shields will in this position be capable of maintaining the rocking axis of the roller 3 in this position.

Fig. 12 shows another modification of this invention and at the same time illustrates part of the gearing provided with rollers arranged according to this invention. In the example shown conical races 1, 2 are used, instead of toric races, between which the planet rollers 3 are inserted. The section through the races is a vertical section, while the roller is for the sake of illustration assumed to be cut by a plane passing through the inclined rocking axis. The bolts 4 are in this case fixed on a disc 30 which is mounted on the shaft 31 rotating at slow speed. On said bolts 4 the rollers are journalled in a way similar to that shown in Figs. 3 and 4. The bolts 4 are provided with a shoulder against which the pivot bearing 14 is bearing which is fixed in its position relatively to the bolt 4 by means of a splint 32. The pivot bearing 14 carries the lower part of the two pivots or trunnions 16 which enter with their upper parts into the bearing ring 15 of the roller 3. Between the bearing ring 15 and the pivot bearing 14 two thrust bearings 15' are provided which allow rocking of the roller around the trunnions or pivots 16.

Change of speed is in this case not performed by tilting the roller but by longitudinal movement of one of the races or of both races, this being however substantially the same adjustment as that described in the previous cases.

I wish it to be understood that the examples given are only shown as several constructive embodiments of the invention but that other constructions may also be used without departing from the essence of the invention.

What I claim is:

1. In a change speed friction gearing comprising planet rollers arranged between races adapted to vary their relative position, adjusting means for varying the position of each roller, comprising a tiltable frame capable of being rocked about an axis, and means journalling each roller upon said frame to maintain a fixed axis for the rocking movement of the roller, said journalling means including a pivotal bearing for the roller mounted so as to allow a self-adjusting rocking movement about an axis perpendicular to the axis of rotation of the roller, allowing free movement around said axis.

2. In a change speed frictional gearing according to claim 1, means for rigidly connecting the journalling means for each roller.

3. A journalling device for the planet rollers of a change speed frictional gear according to claim 1, in which said pivotal bearing is provided with thrust bearing surfaces, a bearing ring provided with corresponding thrust bearing surfaces, pivots in operative connection with the pivot bearing and with a bearing ring allowing free movement of the roller around the axis of the pivots.

4. A journalling device for the planet rollers of a change speed frictional gearing according to claim 1, including an axle upon said frame, journalling means for the rollers on said axle allowing free movement of the roller in every direction, shields on said carrier frame provided with projecting parts adapted to come into operative contact with the roller, thus limiting the movement of the roller in one direction and maintaining an axis around which free movement of the roller is allowed.

5. A journalling device for the planet rollers of a change speed frictional gearing according to claim 1, including an axle fixed upon said frame, journalling means upon said axle allowing free movement of the roller in every direction, lateral shields carried by said frame enclosing the roller and provided with a projection adapted to come in operative contact with the lateral faces of the roller, said shields being loosely mounted upon said axle, and a stop for fixing the operative position of the loosely mounted shields.

6. In a change-speed friction gearing the combination with planet rollers and race rings therefor, of a carrier, and means journalling said rollers to said carrier so as to permit each roller a self-adjustable free rocking movement around one axis perpendicular to the axis of rotation of the roller and forming an angle of less than 90° with a line drawn through the contact points of the roller with the race rings.

7. In a change-speed friction gearing comprising race rings and rolling bodies therebetween, a carrier and means journalling each roller to said carrier, comprising a bearing for said roller to rotate freely thereon, said bearing being capable of a limited but self-adjustable free rocking movement around one definite axis perpendicular to the axis of rotation of the roller and forming an angle of less than 90° with a line drawn through the contact points of the roller with the race rings.

8. In a change-speed friction gearing comprising race rings and rollers therebetween, a carrier for said rollers, and means journalling the rollers to said carrier comprising bearings for each of said rollers, each of said bearings being mounted on a pivot fastened to said carrier, said pivot allowing a free rocking movement within the limits of about 20° to each side of its normal position to the rollers, the geometrical axis of said rocking movement forming an angle of 90° with the axis of rotation of said rollers and an angle of less than 90° with a line connecting the contact points of the roller with the race rings.

9. In a change-speed friction gearing, race rings and rollers therebetween, capable of making contact with said race rings at different angles of inclination with respect to the main axis of the gearing, a carrier for said rollers comprising a tiltable frame for each of the said rollers, and means journalling each of said rollers to its frame, said means comprising a bearing for said rollers and a pivot fastened to said frame, said bearing being mounted on said pivot with a free self-adjustable rocking movement around one axle perpendicular to the axis of rotation of the roller and forming an angle of less than 90° with a line connecting the contact points of the roller with the race rings.

In testimony whereof I affix my signature.

RICHARD ERBAN.